United States Patent [19]

Schukei et al.

[11] Patent Number: 4,758,402
[45] Date of Patent: Jul. 19, 1988

[54] REFUELING SEAL ARRANGEMENT FOR NUCLEAR REACTOR VESSEL

[75] Inventors: Glen E. Schukei, South Windsor; Adolph W. Viets, East Granby, both of Conn.

[73] Assignee: Combustion Engineering, Inc., Windsor, Conn.

[21] Appl. No.: 811,643

[22] Filed: Dec. 20, 1985

[51] Int. Cl.⁴ .................. B65D 53/00; F16J 15/46; G21C 13/06
[52] U.S. Cl. .................. 376/205; 220/324; 220/378; 220/432; 220/232; 277/12; 277/34; 277/58; 292/241; 376/203
[58] Field of Search .............. 376/203, 205; 277/1, 277/34, 12, 58; 292/240, 241; 220/430–433, 324, 378, 232

[56] References Cited

U.S. PATENT DOCUMENTS

| | | | |
|---|---|---|---|
| 797,768 | 8/1905 | Fisher | 292/240 X |
| 888,364 | 5/1908 | Stotz | 292/241 |
| 1,149,488 | 8/1915 | Arndt | 292/240 |
| 1,198,166 | 9/1916 | Stoddard | 292/241 X |
| 1,560,654 | 11/1925 | Brede | 292/241 |
| 2,256,013 | 9/1941 | Brouse | 220/432 |
| 2,263,843 | 11/1941 | Gross | 292/241 X |
| 2,666,248 | 1/1954 | Slaughter, Jr. | 292/240 X |
| 3,171,381 | 3/1965 | Meek | 277/34 X |
| 3,178,779 | 4/1965 | Clark et al. | 277/34 X |
| 3,633,784 | 1/1972 | Taft | 376/205 |
| 4,214,760 | 7/1980 | Godfrey | 376/205 X |
| 4,584,163 | 4/1986 | Hankinson | 376/205 |

FOREIGN PATENT DOCUMENTS

| | | | |
|---|---|---|---|
| 1393401 | 2/1965 | France | 277/34 |
| 2115788 | 9/1983 | United Kingdom | 376/203 |

Primary Examiner—Allan N. Shoap
Attorney, Agent, or Firm—Chilton, Alix & Van Kirk

[57] ABSTRACT

An annular plate is mounted on and sealed to the spaced apart pressure vessel flange and vessel containment structure of a nuclear reactor to form a leak-proof bottom for a refueling canal for the reactor. The sealing arrangement for the plate establishes redundant seals to each of the flange and containment structure, the seals being pneumatically expandable to enhance the integrity thereof.

17 Claims, 1 Drawing Sheet

U.S. Patent     Jul. 19, 1988     4,758,402
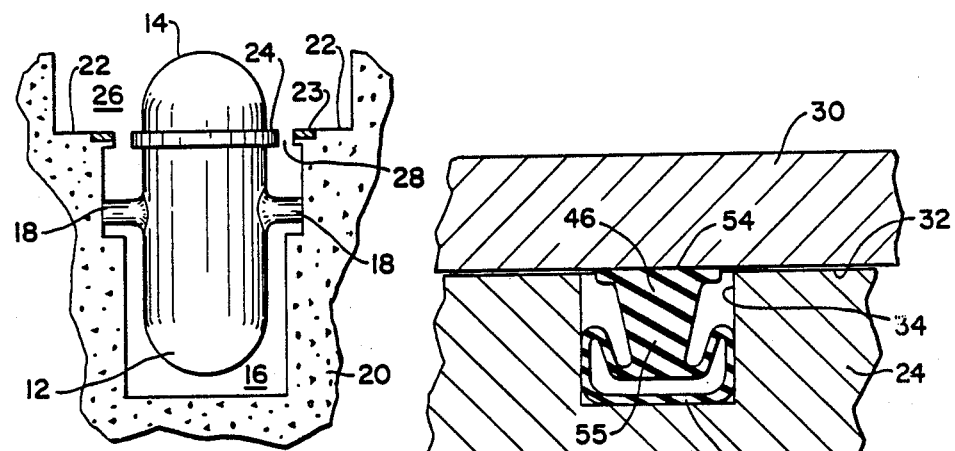
FIG. 1
FIG. 3
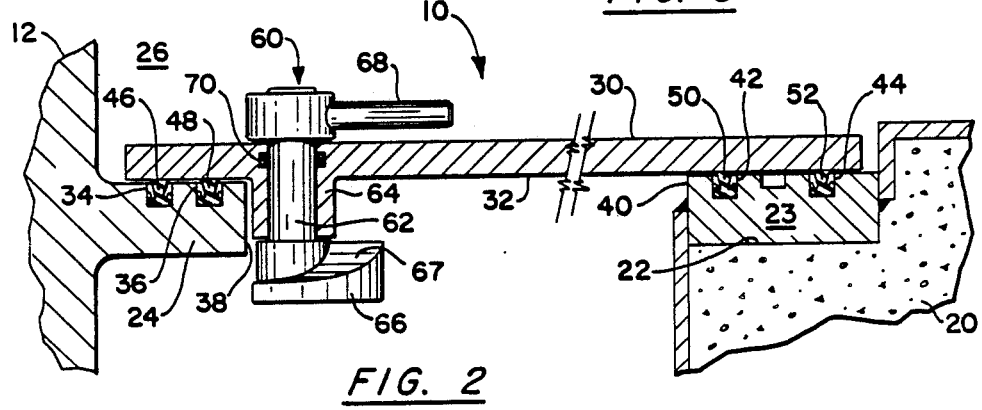
FIG. 2
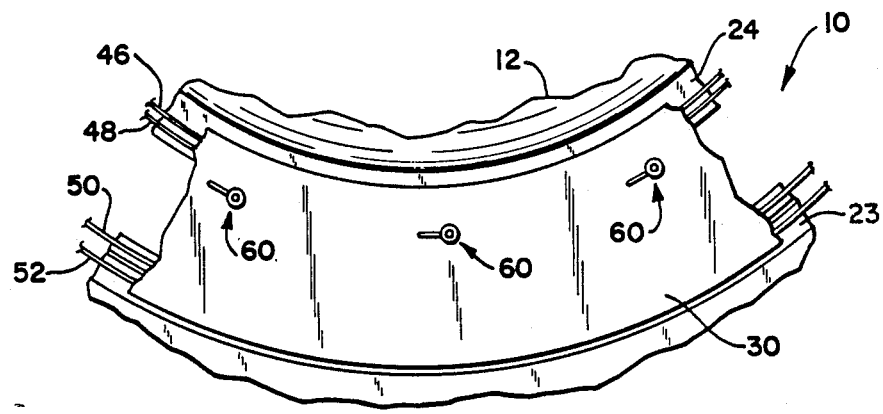
FIG. 4

REFUELING SEAL ARRANGEMENT FOR NUCLEAR REACTOR VESSEL

BACKGROUND OF THE INVENTION

1. FIELD OF THE INVENTION

This invention generally relates to sealing the space between opposing spaced surfaces or ledges and particularly to a new and improved sealing arrangement for implementing a temporary seal to provide a floor for supporting a liquid. More specifically, the present invention is directed to a method for establishing a seal between a pair of spaced generally planar annular surfaces and especially to forming a leak-proof demountable floor for a refueling canal for a nuclear reactor. Accordingly, the general objects of the present invention are to provide novel and improved apparatus and methods of such character.

2. DESCRIPTION OF THE PRIOR ART

The present invention is particularly well suited for use in nuclear reactor power plants for establishing a temporary seal between the reactor pressure vessel and the inner wall of the vessel containment structure. The refueling process for pressurized water reactors is ordinarily performed under approximately 25 feet of water in a refueling canal disposed above the main body of the reactor vessel. During the refueling process, the reactor vessel cavity in the containment structure under the canal must remain dry to prevent contamination of the vessel or equipment located in the cavity about the exterior of the vessel. During normal power operation governmental and licensing regulations require that no liquid remain in the refueling canal so that an emergency escape path is formed. Consequently, the sealing arrangement which isolates the bottom of the refueling canal from the lower cavity during the refueling process can not remain in place during normal reactor operation.

The reactor vessels of conventional pressurized water reactors have a circumferential flange which extends transversely outwardly from the vessel wall. The vessel is mounted in a cavity formed by a massive containment structure. A ledge is formed in the containment structure in spaced relationship to the vessel flange. The upper surfaces of the flange and ledge are substantially co-planar. Conventional arrangements for temporarily forming the floor of the refueling canal involve the use of massive steel ring plates which may have outside diameters as large as 25 feet and widths varying from one to three feet. The ring plates are suspended from the flange and the ledge. Compression seals carried by the ring plate seal against the flange and the ledge. The ring plate may be bolted to compress the seals and form a liquid impervious seal.

One of the principal deficiencies of the foregoing conventional sealing arrangement is the requirement that the lower surface of the ring plate be precision machined during the fabrication process in order to provide a sealing surface for the compressive sealing engagement throughout the circumferential extent of the plate/seal interface. The necessity of precise machining of the ring plate essentially precludes assembly of the plate in the field. Consequently, the massive size of the conventional ring plate generally requires that the containment building be erected subsequent to the arrival of the plate at the reactor site. In addition, thermal expansion and structural shiftings of the reactor structures over time tend to adversely modify the sealing characteristics of the ring plates thereby requiring additional compensating arrangements to insure adequate sealing integrity.

More recent sealing arrangements involve substituting an inflatable seal for the compression seals and bolts to compensate for imperfections in the ring plate sealing surface and the shifting of the flange and/or ledge structures. The inflatable seals are energizable for expansion between the flange and the plate to provide a high degree of sealing integrity. In U.S. Pat. No. 4,214,760, entitled "Seal For Adjacent Plates", an arrangement for temporarily sealing the space between two substantially parallel adjacent plates employs a single flexible partially inflatable seal located between the plates to effect a primary and a secondary sealing interface along the upper and lower edges of the plates. The seal has a wedge-shaped upper portion, a tubular lower portion and a substantially solid intermediate shank. The tubular end of the seal is inflated so that it expands into contact with the lower edges of the adjacent plates thereby drawing the wedge-shaped upper portion of the seal toward the tubular portion to form a primary sealing interface between the wedge-shaped portion and the upper edges of the plates. The contact of the inflated tubular portion with the lower edges of the plates forms the secondary seal interface. The seal is flexible and thus can conform to rough surfaces such as may be present on reactor pressure vessel flanges, containment structures and ring plates.

Any sealing arrangement which employs inflatable seals without a reserve or backup seal mechanism is susceptible to failure in the event of failure of an inflatable member.

SUMMARY OF THE INVENTION

Briefly stated, the invention in a preferred form is a technique for sealing a flange to a spaced opposing ledge to form a floor for a cavity which may be filled with a liquid. A plate is positioned above the flange and the ledge and spans the gap between the flange and ledge to support a body of liquid. An inflatable seal assembly which is adaptable for positioning between the plate and the underlying flange/ledge is energizable upon introduction of an inflation pressure from a deflated state to an inflated state. In the deflated state a passive liquid seal is formed between the plate and underlying member in response to the load exerted by the weight of the plate. In the inflated state an active liquid seal is formed between the plate and underlying structure in response to the load exerted by the inflation pressure. A locking mechanism is mounted to the plate and is engageable with the flange to releasably lock the plate to the flange.

Accordingly, the present invention is a new and improved inflatable seal arrangement for use in creating a temporary refueling canal for a nuclear reactor pressure vessel. This seal arrangement forms a passive seal in the event of failure of the inflation system. The new and improved seal arrangement of the invention also provides a double or redundant seal.

The seals employed in the practice of the present invention preferably comprise an inflatable elastomer seal member which has a solid relatively thick base and an inflatable tubular portion. The inflatable seal members are received in grooves in a flange and ledge which are to be bridged by the seal arrangement. The lock mechanism comprises a rotatable shaft and an engageable member having an inclined cam surface.

BRIEF DESCRIPTION OF THE DRAWINGS

The present invention may be better understood and its numerous objects and advantages will become apparent to those skilled in the art by reference to the accompanying drawing wherein like reference numerals refer to like elements in the several figures and in which:

FIG. 1 is an elevational view, partly in section, of a reactor vessel mounted in a reactor vessel cavity of a containment structure;

FIG. 2 is a fragmentary sectional view, partly broken away, illustrating a seal arrangement in conjunction with, a reactor vessel flange and a refueling canal ledge in/accordance with the present invention;

FIG. 3 is an enlarged fragmentary sectional view illustrating the sealing arrangement of FIG. 2 with a seal thereof being activated to an inflated state; and FIG. 4 is a fragmentary top plan view, partly broken away, of the sealing arrangement of FIG. 2.

DETAILED DESCRIPTION OF THE INVENTION

With reference to the drawing, a seal arrangement in accordance with present invention is generally designated by the numeral 10 (FIGS. 2 and 4). The seal arrangement 10 is particularly suited for use in establishing a temporary refueling canal for a nuclear reactor. Thus, FIGS. 1 and 2 depict the preferred application environment of the invention, the seal arrangement 10 being shown in conjunction with a reactor pressure vessel 12 having a vessel top head 14. The reactor vessel 12 is suspended in a reactor vessel cavity 16, defined by a containment structure 20, by means of a plurality of radially protruding vessel nozzles 18.

The reactor vessel containment structure 20 has a generally horizontally disposed refueling canal ledge 22 which extends circumferentially around the cavity 16. A flange 24 protrudes transversely from the reactor vessel 12 and extends circumferentially around the vessel. Flange 24 is located generally opposite the refueling canal ledge 22 in general alignment and equidistantly spaced relationship therewith. A refueling canal 26 is generally defined by the upper walls of the containment structure, the reactor vessel and the canal ledge 22.

During the refueling process, the vessel head 14 is removed from the reactor vessel 12 to provide access to the reactor core (non-illustrated) enclosed within the vessel, the fuel assembly being part of the core. Seal arrangement 10 is temporarily mounted to establish a liquid-tight seal between the vessel flange 24 and the containment ledge 22 for supporting a body of water in the upper refueling canal. The refueling canal 26 is filled with water after installation of seal arrangement 10. It is critical that none of the water delivered into the refueling canal 26 leak into the lower vessel cavity 16 because this "refueling" water would present a potential for contaminating the vessel and equipment located in the vessel cavity. Because of governmental and safety regulations, the annular space 28 between the vessel flange 24 and the canal ledge 22 cannot be sealed during normal plant operations in order that a steam blow path be provided via space 28 from the vessel cavity 16. Consequently, seal arrangement 10 is configured so that it may be dismounted once the refueling process is completed.

With reference to FIGS. 2 through 4, a sturdy metal ring plate 30 spans the annular space 28 and is dimensioned to be supported above both flange 24 and ledge 22. Plate 30 is a unitary member having a generally uniform width and thickness and is constructed from stainless steel or some other similar material. The material from which plate 30 is formed, and its thickness, are chosen to insure that the seal arrangement will be capable of withstanding the intense pressures exerted by a substantial column of water in the refueling canal above the mounted plate 30 and to also withstand the impact from a dropped fuel assembly. Consequently, the thickness of a steel ring plate 30 may be as great as 1½ inches and the width may vary from a few inches to in excess of 2 feet with an outside diameter as great as 25 feet depending on the cavity configuration for the particular reactor. In accordance with a feature of the present invention, precision machining of the lower surface 32 of the ring plate to form a smooth sealing surface is not required in order to obtain the required sealing characteristics for the sealing arrangement 10.

The upper surface of pressure vessel flange 24 forms a generally horizontally disposed planar support shoulder. A pair of parallel annular grooves 34 and 36 are provided in the upper surface of the flange 24. Ledge 22 supports an embedment ring member 23 which has a a generally planar upper surface which extends circumferentially around the containment cavity to form an outer support shoulder. The upper flange surface and the upper ledge surface are preferably generally co-planar. The vertical faces of the flange and ledge form respective opposing generally cylindrical inner edges 38 and 40 which are preferably substantially equidistantly spaced to define annulus 28. The upper surface of embedment ring 23 is also provided with a pair of annular circumferentially extending parallel grooves 42 and 44. In a preferred form, each of grooves 34, 36, 42 and 44 has a substantially identical, uniform rectangular cross-section. The grooves function to locate the seal members of seal arrangement 10 as shall be described below. In an alternative arrangement, the grooves 34, 36, 42 and 44 will be formed in plate 30 and the cooperating ring seals, which will be described below, are reversed relative to the orientation shown in FIG. 3.

Two sets of parallel ring seals 46, 48 and 50, 52 are interposed in the grooves for sealing engagement against the lower surface 32 of ring plate 30 to provide a fluid tight interface between the ring plate and the respective flange and ledge to thereby provide a temporary refueling canal 26 above the ring plate. The refueling canal will be filled with water during the refueling process. By virtue of the seal configuration hereinafter described, the cavity 16 below the positioned ring plate remains free of water during the refueling process.

Ring seal 46 and ring seal 48 are each unitary elastomer seal members having a quasi-annular shape and are configured to be received in respective flange grooves 34 and 36 to provide a continuous seal interface therewith. Likewise ring seal 50 and ring seal 52 are each unitary elastomer seal members having a quasi-annular shape and are configured to be received in respective ledge grooves 42 and 44 to provide a continuous seal interface therewith. The elastomer ring seals may be placed in the respective grooves or may be mounted to the lower surface 32 of ring plate 30. In the latter mounting configuration, each ring seal is affixed to surface 32 at a position which permits alignment of the seal ring with a cooperating groove so that the plate may be disposed above the flange and ledge and supported by the seals as illustrated in FIG. 2.

Each of the ring seals preferably has a substantially identical cross-section. The seal configuration functions to provide a sealing interface between the ring plate and the cooperating flange or ledge. With reference to FIG. 3, an exemplary ring seal 46 for use in the practice of the invention is an inflatable seal formed of 40 Duro or other elastomer material. Seal 46 has a relatively thick solid upper or base portion 54 which forms a continuous band to sealingly engage the plate lower surface 32 along a circular path. An intermediate shank portion 55 of seal 46 tapers from the base 54 to a tubular section 56 at the opposing or lower end. The tubular section 56 has a relatively thin wall which in a passive configuration is generally conformable to the surrounding lower walls of the cooperating groove. In the passive or uninflated configuration, the ring seal 46 forms a passive liquid seal. The rigid base 54 and shank 55 cooperate to force the deformable tubular section 56 in opposing transverse directions under the load exerted downwardly by the weight of the steel ring plate with the extreme lower and upper surfaces of the seal forming a compression seal between the plate and the flange.

The ring seal 46 is inflatable to an energized state wherein the upper base 54 and the exterior surfaces of the lower tubular section 56 are respectively forced into intimate sealing engagement with the corresponding lower surface of the ring plate and the bottom and side walls of the cooperating groove as illustrated in FIG. 3. The seal and cooperating groove are dimensioned so that upon inflation of the seal 3 the lower tubular section expands to resiliently sealingly engage three walls of the groove, i.e., the inflation pressure forces the ring seal into intimate sealing relationship with the plate and the groove walls and thus any uneven or rough regions of the flange or plate structure will not prevent establishment of a fluid-tight seal. An air tap (not illustrated) may extend through the plate into the ring seal to introduce air into the tubular section interior to activate the seal. It should be appreciated that each of the seals 48, 50 and 52 have substantially the same sealing characteristics and function in substantially the same manner as that described for ring seal 46.

In the inflated mode, the load applied by the inflation pressure exceeds the load exterted by the weight of the steel ring plate and thus tends to lift the plate from the flange.

A plurality of cam lock mechanisms 60 are angularly spaced around the ring plate 30 for clamping the plate to the underside of the flange 24. Cam lock mechanisms 60 each include a vertical shaft 62 which is rotatably received in a boss 64 protruding from the lower surface of the ring plate. The boss 64 enhances the structural rigidity of the plate and the lock mechanism. An eccentric clamp member 66 is mounted to the bottom of shaft 62 for rotation with the shaft. The clamp member forms an upper spiral cam surface 67 to provide a rotatably variable clamping.

A lever 68 extends radially at the top of the shaft 62 above the plate 30 to facilitate manual rotation of the shaft from an unlocked position illustrated in FIG. 2 to a locked position. An O-ring 70 seals the shaft 62 to the ring plate to provide a liquid tight seal. Upon manual rotation of the lever 68, the spiral cam surface 67 engages the underside of the flange to clamp the ring plate 30 to the flange 24 to thereby prevent upward movement of the plate upon inflation of the ring seal. Because the flange overhead structure is relatively short, the bulk of the load applied to the ring plate is in shear. Because of the mass of the ring plate, the cam lock mechanisms 60 need only provide sufficient clamping force to hold the ring plate in place for activation of the seals. For example, in one embodiment of the seal arrangement 10 as described, upon inflation of ring seals 50 and 52, a bending moment of only approximately 1,500 pounds at the maximum load region is produced. The latter moment is well within the retention capabilities of the cam lock mechanisms 60.

The above-described sealing arrangement 10 provides numerous advantages over prior art sealing arrangements. Independent double sealing interfaces are provided so that in the event of the failure of one of the elastomer inflatable seals, the sealing integrity of the sealing arrangement is not unduly compromised. In addition, in a passive mode wherein either all of the seals fail, or prior to the inflation of the ring seals, a passive liquid seal is formed by the seals. Upon inflation of the ring seals, the seals resiliently expand to accommodate wide surface variations in the cooperating sealing surfaces of the plate, flange and ledge as well as numerous other imperfections. It will be further appreciated that seal arrangement 10 may be installed and dismounted in an efficient manner.

While a preferred embodiment of the foregoing invention is set forth for purposes of illustration, the foregoing description should not be deemed a limitation invention herein. Accordingly, various modifications, adaptations and alternatives may occur to one skilled in the art without departing from the spirit or scope of the present invention.

What is claimed is:

1. An arrangement for sealing a flange circumferentially extending from a nuclear reactor vessel to a spaced opposing ledge to form a floor for a cavity above the reactor vessel to be filled with liquid comprising:

plate means being sized and shaped for positioning above the flange and ledge to span the space therebetween and support a body of liquid, said plate means overlying at least part of the ledge and flange;

flange seal means adaptable for positioning between the flange and said plate means, said flange seal means being at least partly inflatable and energizable in response to an inflation pressure from a deflated state wherein a passive liquid seal is formed between the flange and said plate means in response to mechanical loading by said plate means to an inflated state wherein an active liquid seal is formed between the flange and said plate means at least in part in response to forces generated in response to the inflation pressure;

ledge seal means adaptable for positioning between the ledge and said plate means, said ledge seal means being at least partly inflatable and energizable upon introduction of an inflation pressure from a deflated state wherein a passive liquid seal is formed between the ledge and said plate means in response to mechanical loading by said plate means to an inflated state wherein an active liquid seal is formed between the ledge and said plate means at least in part in response to the forces generated in response to the inflation pressure; and lock means mounted to said plate means and engageable with only the flange to releasably lock the plate means to the flange to prevent upward movement of the plate upon inflation of the flange seal means and the ledge seal means.

2. The arrangement of claim 1 wherein at least one of said seal means comprises an elastomer seal member having first and second end portions, said first end portion forming a substantially solid relatively thick resilient seal member and said second end portion forming an inflatable tubular structure defined by relatively thin walls.

3. The arrangement of claim 2 wherein said first end portion forms a band-like sealing surface.

4. The arrangement of claim 2 wherein said second end portion forms a flexible sealing interface which is deformable to provide a sealing interface along three distinct sealing surfaces.

5. The arrangement of claim 1 wherein said lock means comprises a rotatable shaft and an engagement member mounted to said shaft, said engagement member forming an inclined cam surface which is engageable with the flange upon rotation of said shaft.

6. The arrangement of claim 1 wherein said plate means comprises a plate having a generally annular shape with a substantially uniform width and thickness.

7. The arrangement of claim 1 wherein at least one of said seal means comprises a pair of partially inflatable seal members, each of said seal members being independently energizable between a deflated and an inflated state.

8. The arrangement of claim 7 wherein both of said seal members of said pair comprise an elastomer seal member having first and second end portions, said first end portion forming a substantially solid relatively thick resilient seal and said second end portion forming an inflatable tubular structure defined by relatively thin walls.

9. The arrangement of claim 8 wherein said second end portion of each of said elastomer members forms a flexible sealing interface which is deformable to provide a sealing interface along three distinct sealing surfaces.

10. The arrangement of claim 9 wherein said first end portion of each of said elastomer members forms a band-like sealing surface.

11. The arrangement of claim 10 wherein said lock means comprises a rotatable shaft and an engagement member mounted to said shaft, said engagement member forming an inclined cam surface which is engageable with the flange upon rotation of said shaft.

12. In combination, a sealing arrangement between a nuclear reactor vessel having a circumferential flange and a ledge annularly spaced therefrom, comprising:
said flange having an upper surface and at least one groove traversing said upper surface;
said ledge spaced from said flange and having an upper surface generally co-planar with said flange upper surface and at least one groove traversing said ledge upper surface;
plate means having a lower surface which spans the space between said flange and ledge, said plate means being disposed above and partly overlapping said flange and ledge;
flange seal means received in said flange groove to establish a seal between said flange and said plate means lower surface, said flange seal means being partly inflatable and being energizable in response to an inflation pressure from a deflated state wherein a passive liquid seal is formed between said flange and said lower surface in response to mechanical loading by said plate means to an inflated state wherein an active liquid seal is formed between said flange and said plate means lower surface as a result of forces generated in response to the inflation pressure;
ledge seal means received in said ledge groove to establish a seal between said ledge and said plate means lower surface, said ledge seal means being energizable in response to an inflation pressure from a deflated state wherein a passive liquid seal is formed between said ledge and said lower surface in response to mechanical loading by said plate means to an inflated state wherein an active liquid seal is formed between said ledge and said lower surface as a result of forces generated in response to the inflation pressure; and
lock means mounted to said plate means and engageable with only said flange to releasably lock the plate means to the flange to prevent upward movement of the plate upon inflation of the flange seal means and the ledge seal means.

13. The combination of claim 12 wherein at least one of said seal means comprises an inflatable ring seal.

14. The combination of claim 13 wherein the inflatable ring seal comprises a tubular section and a base section, said tubular section being deformable to seal against the boundaries of said corresponding groove and said base portion sealingly engaging said plate means lower surface.

15. The combination of claim 12 wherein said flange has two substantially parallel grooves traversing said upper surface and said flange seal means comprises two inflatable seal members, each of said seal members being received in a flange groove.

16. The combination of claim 15 wherein said ledge has two substantially parallel grooves traversing said upper surface and said ledge seal means comprises two inflatable seal members, each of said seal members being received in a ledge groove.

17. The combination of claim 12 wherein said lock means comprises a rotatable shaft extending through said plate means, a lock member being mounted to said shaft and forming a spiral cam surface which is engeagable with said flange to lock the plate means to the flange upon rotation to said shaft.

* * * * *